(12) United States Patent
Baran (10) Patent No.: US 7,849,488 B2
(45) Date of Patent: Dec. 7, 2010

(54) VIDEO MODEM TERMINATION SYSTEM AND METHOD

(75) Inventor: David Baran, Atherton, CA (US)

(73) Assignee: GoBack TV, Inc., Menlo Park, CA (US)

(*) Notice: Subject to any disclaimer, the term of this patent is extended or adjusted under 35 U.S.C. 154(b) by 1524 days.

(21) Appl. No.: 10/892,532

(22) Filed: Jul. 15, 2004

(65) Prior Publication Data

US 2005/0138669 A1 Jun. 23, 2005

Related U.S. Application Data

(60) Provisional application No. 60/531,655, filed on Dec. 23, 2003.

(51) Int. Cl.
*H04N 7/173* (2006.01)
*H04L 12/66* (2006.01)

(52) U.S. Cl. ........................ 725/111; 725/120; 725/131; 370/352

(58) Field of Classification Search .................. 725/111
See application file for complete search history.

(56) References Cited

U.S. PATENT DOCUMENTS

| | | | |
|---|---|---|---|
| 7,023,871 B2 * | 4/2006 | Lind et al. .................. 370/437 |
| 7,113,502 B2 * | 9/2006 | Oz et al. ..................... 370/352 |
| 7,274,667 B2 * | 9/2007 | McKinnon et al. .......... 370/234 |
| 7,451,475 B1 * | 11/2008 | Oz et al. ..................... 725/127 |
| 7,688,828 B2 * | 3/2010 | Chapman et al. ....... 370/395.21 |
| 2002/0046406 A1 * | 4/2002 | Chelehmal et al. ............ 725/87 |
| 2002/0056143 A1 * | 5/2002 | Hodge et al. ................. 725/153 |
| 2004/0181800 A1 * | 9/2004 | Rakib et al. .................. 725/25 |
| 2005/0047442 A1 * | 3/2005 | Volpe et al. .................. 370/480 |
| 2005/0055685 A1 * | 3/2005 | Maynard et al. ............ 717/170 |
| 2007/0140298 A1 * | 6/2007 | Eng ............................ 370/485 |

* cited by examiner

*Primary Examiner*—John W Miller
*Assistant Examiner*—Chris Parry
(74) *Attorney, Agent, or Firm*—Haynes Beffel & Wolfled LLP; Ernest J. Beffel, Jr.

(57) ABSTRACT

Highly asymmetrical nature of digital video allows a single Cable Modem Termination System (CMTS) like device to support the transmission over a thousand individual high-quality IP packetized video data channels terminating into low cost cable modem units. A Video Modem Terminating System (VMTS) unit handles housekeeping information. As the amount of upstream housekeeping data are small, even for 1000 simultaneous TV channels, the data can be inserted into the digital video cell streams and packaged within IP packet envelopes. The VMTS unit is equally effective for MPEG-2, MPEG-4, Microsoft Media 9 and other digital encoding of video and audio signals.

27 Claims, 11 Drawing Sheets

VIDEO MODEM TERMINATION SYSTEM AND METHOD

RELATED PATENTS

This patent stems from a U.S. provisional patent application Ser. No. 60/531,655, and filing date of Dec. 23, 2003, entitled VIDEO MODEM TERMINATION SYSTEM, by inventor, DAVID BARAN. The benefit of the earlier filing date of the provisional patent application is claimed for common subject matter.

BACKGROUND OF THE INVENTION

This invention reduces the cost of delivering digital IP video TV signals to the home over cable and systems in general, and more particularly, utilizing the asymmetrical nature of video transmission.

DESCRIPTION OF THE RELEVANT ART

Figure 1:
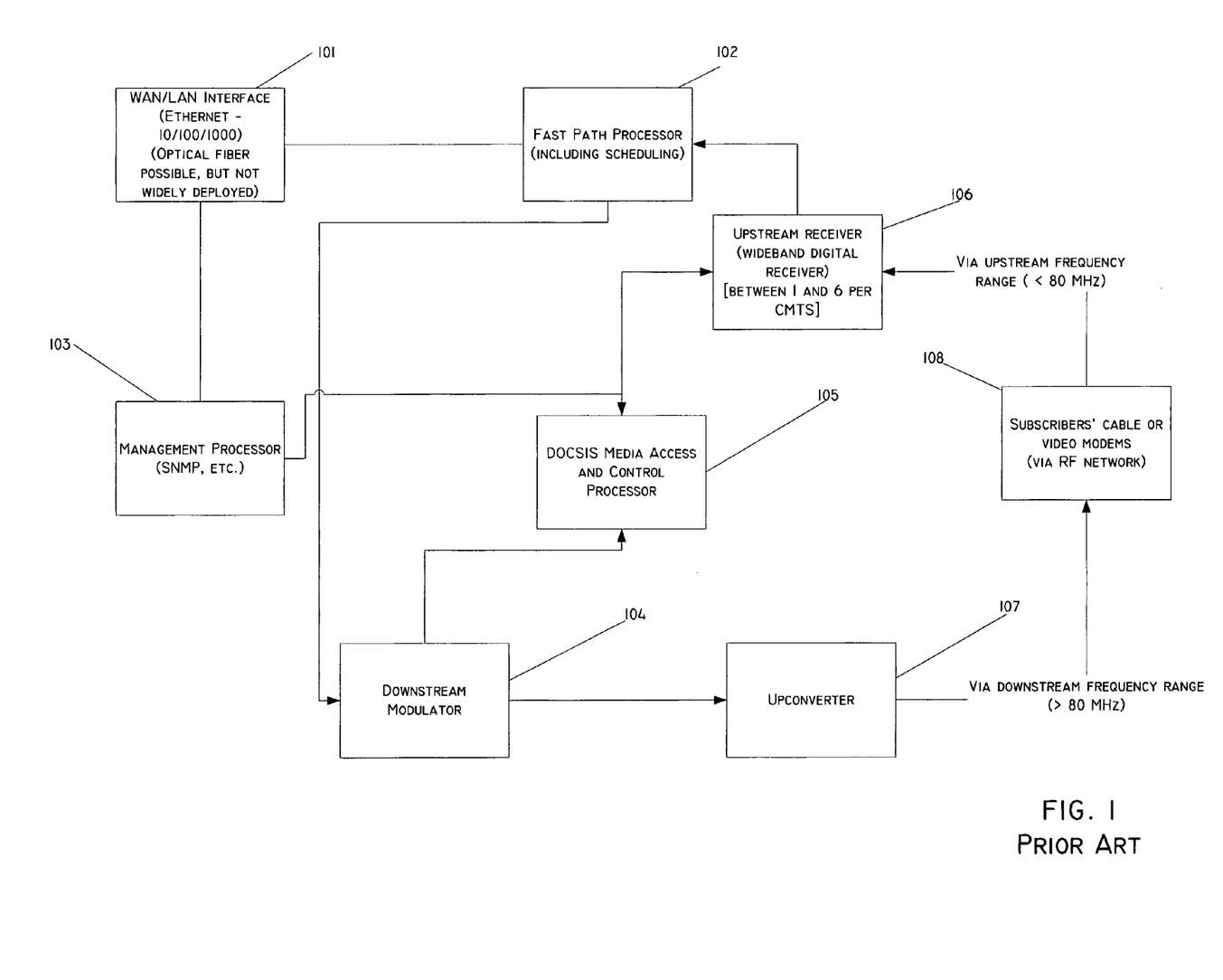
FIG. 1 is a block diagram of a prior art conventional CMTS unit.

Cable operators desire to send digital video as Internet Protocol (IP) video, as used on the Internet, via their present inexpensive Data Over Cable Service Interface Specification (DOCSIS) cable modems, which uses IP packets. The cost limitation of video over DOCSIS channels is that a separate expensive Cable Modem Termination System (CMTS) is required for each 6 MHz downstream channel. The DOCSIS Cable Modem Terminating System (CMTS) is defined in ANSI/Society of Cable Television Engineers (SCTE) specifications 22-1, 22-2, 22-3, 23-1, 23-3 and additionally in CableLabs' specifications SP-RFIv2.0, SP-OSSIv2.0, SP-BPI+, SP-BPI, SP-CMCI, and SP-CMTS-NSI and are manufactured by several companies. Highly similar units are made in accordance with the Euro-DOCSIS standard, which is defined by several appendices in the previously listed specifications, and are optimized for the European 8 MHz channelized cable systems instead of the 6 MHz channels used in North America. The term "CMTS", as used herein, applies to devices constructed to either specification. A representative prior art CMTS unit is shown in FIG. 1. The CMTS unit includes a WAN/LAN interface 101, a fast path processor 102, a management processor 103, a downstream modulator 104, a DOCSIS media access and control processor 105, an upstream receiver 106, an up-converter 107, and a subscriber's cable or video modem 108. The WAN-LAN interface 101 is connected to the management processor 103 and the fast path processor 102. The fast path processor is connected to the downstream modulator 104, and the upstream receiver 106. The management processor is connected to the DOCSIS access and control processor 105. The downstream modulator 104 is connected to the up-converter 107 and the DOCSIS media access and control processor 105. The DOCSIS media access and control processor 105 is connected to the upstream receiver 106. The subscriber's cable or video modems 108 are connected to the upstream receiver 106 and the up-converter 107.

The upstream receiver 106 typically is a wideband digital receiver. The upstream receiver 106 has at least one, and may have six or more, wideband digital receivers. More may be used, for particular applications and alternative cable network topologies.

The WAN/LAN interface 101 connects to Ethernet at 10/100/1000 data rates. Twisted pair or optical fiber currently are used as the physical media. The fast path processor 102 passes data from the upstream receiver 106 to the WAN/LAN interface 101. The fast path processor 102 also passes data from the WAN/LAN interface 101 to the downstream modulator 104. The term "fast path" comes from the fact that this processor is involved with all data transfers into or out of the CMTS, and thus must be "fast" to avoid producing undesirable packet latency or loss. The downstream modulator 104 passes the modulated data to the up-converter 107, which sends data, typically in the radio frequency range greater than 80 MHz, to the subscriber's cable or video modems 108. The management processor 103 is responsible for scheduling transmissions over the cable network as well as providing system status information using protocols such as SNMP.

Received data, typically in the radio frequency range greater than 80 MHz, from the subscriber's cable or video modems 108, are received by the downstream receiver 106. SNMP and related management control are performed by management processor 103. DOCSIS media access and control processor 105 controls the downstream modulator 104 and the upstream receiver 106.

As CMTS units are very expensive, a separate CMTS unit or even a CMTS blade, i.e., a plug in card within a larger chassis, within a larger CMTS chassis required for each 6 MHz channel makes this approach economically infeasible for video distribution. Unlike the case for digital video CMTS units are cost effective for data because a single CMTS is able to handle more than a thousand data users reducing the cost per user. But as each 6 MHz channel supports only about 10 MPEG digital video channels using, for example, 64-QAM modulation, if an expensive CMTS unit was required for each 6 MHz channel, the resulting cost would be prohibitive.

One alternative approach is to use a dedicated CMTS unit to deliver control information combined with an apparatus such as an edge QAM modulator, or one or more QAM modulators, to generate multiplicity of 6 MHz QAM modulated channels dedicated to carrying digital TV. This approach is workable, but two separate tuners are required for each set top unit. One tuner in each set top is needed for video and the other for DOCSIS control signals.

Today's cable systems send digital video as MPEG cells, i.e., packets, on 6 MHz QAM modulated TV channels to set top units. As a separate set top is required for each separate TV set and as their cost is high, today's set top costs form an economic impediment to the all-digital cable evolution.

SUMMARY OF THE INVENTION

A general object of the invention is to remove the need for a separate CMTS unit for each 6 MHz video channel.

A second objective is to reduce the cost of the set-top unit by eliminating the need for a second tuner or cable modem in each set-top unit. This is accomplished by replicating the downstream cable modem control signals in each 6 MHz channel containing digital video date by interspersing it into unused cell positions and concatenating the upstream cable modem signal for all set-top units into a single dedicated Video Modem Terminating System (VMTS) unit, which controls all of the downstream channels.

Accordingly, the present invention, as embodied and broadly described herein, takes advantage of the highly asymmetrical nature of digital video and uses a single CMTS-like device to support the transmission over a thousand individual high-quality IP packetized video data channels terminating into low cost cable modem units that essentially perform the major functions of the set-top unit. This new invention is called a video modem terminating system (VMTS). The VMTS unit provides a mechanism for delivering a high volume of downstream traffic both on dedicated DOCSIS downstream carriers as well as intermixed with MPEG2 video downstreams. In addition, VMTS unit manages the critical timing necessary to fully utilize the DOCSIS upstream. The VMTS unit handles housekeeping information. It will be appreciated that this approach is equally effective for MPEG-2, MPEG-4, Microsoft Media 9 and other digital encodings of video and audio signals.

The invention includes an edge QAM modulator used with a plurality of set-top units. The invention reduces the equipment required for the downstream transmission of digital video data to a plurality of set-top units. The edge QAM modulator transmits a plurality of downstream radio frequency (RF) carriers. Each carrier conveys a multiplicity of video, audio and control packet streams, individually directed to each of the plurality of set-top units. This creates a virtual circuit to each set-top unit in the plurality of set top units Each set-top unit in the plurality of set top units includes a receiver tuner and circuitry for receiving and decoding the downstream signals uniquely addressed to each set-top unit in the plurality of set top units. Each set-top unit receives TV remote control signals and forming packets and directing the packets upstream to a single common shared CMTS unit.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Reference now is made in detail to the present preferred embodiments of the invention, examples of which are illustrated in the accompanying drawings.

Today's inexpensive standard Data Over Cable Service Interface Specification (DOCSIS) 1.1 cable modems are generally able to support a 100 Mbps Ethernet connection, while the actual data stream delivered today, is restricted to 1 to 2 Mbps, peak for the cable operator's convenience. Each 6 MHz RF channel presently supports up to about 40 Mbps per 6 MHz channel using 256 QAM modulation. The approach described here also is applicable to the EuroDOCSIS standard, which uses an 8 MHz channel to achieve a 25% higher data rate. In the present invention a single Video Modem Terminating System (VMTS) unit is used to handle the housekeeping information and synchronization data, while the bulk video is sent in the form of IP packets over a plurality of 6 MHz channels without requiring a CMTS to be used. For each channel, the standard DOCSIS cable modem is able to handle these packets and output them to an Ethernet connector, which is the most common interface, used. The interface may include a low voltage data signal (LVDS). The DOCSIS cable modem uses the Baseline Privacy (BPI) security arrangement as part of the DOCSIS specification to provide a very secure path. Each DOCSIS system also includes a mechanism for preventing counterfeiting of customer premise equipment through a digital certificate hierarchy known as BPI+. Together, these methods provide a very strong security mechanism against signal theft and service theft. In the pre-digital area, theft of this nature has been known to constitute about 11% of a cable operator's subscriber base. Thus in the present invention the digital video can be securely transmitted and the necessity for the non-standard encryption process presently used by Conditional Access systems is no longer needed. The term Conditional Access relates to the means used by a cable system to ensure that only authorized subscribers' set-top units are able to receive particular content to which they are entitled.

Figure 2:
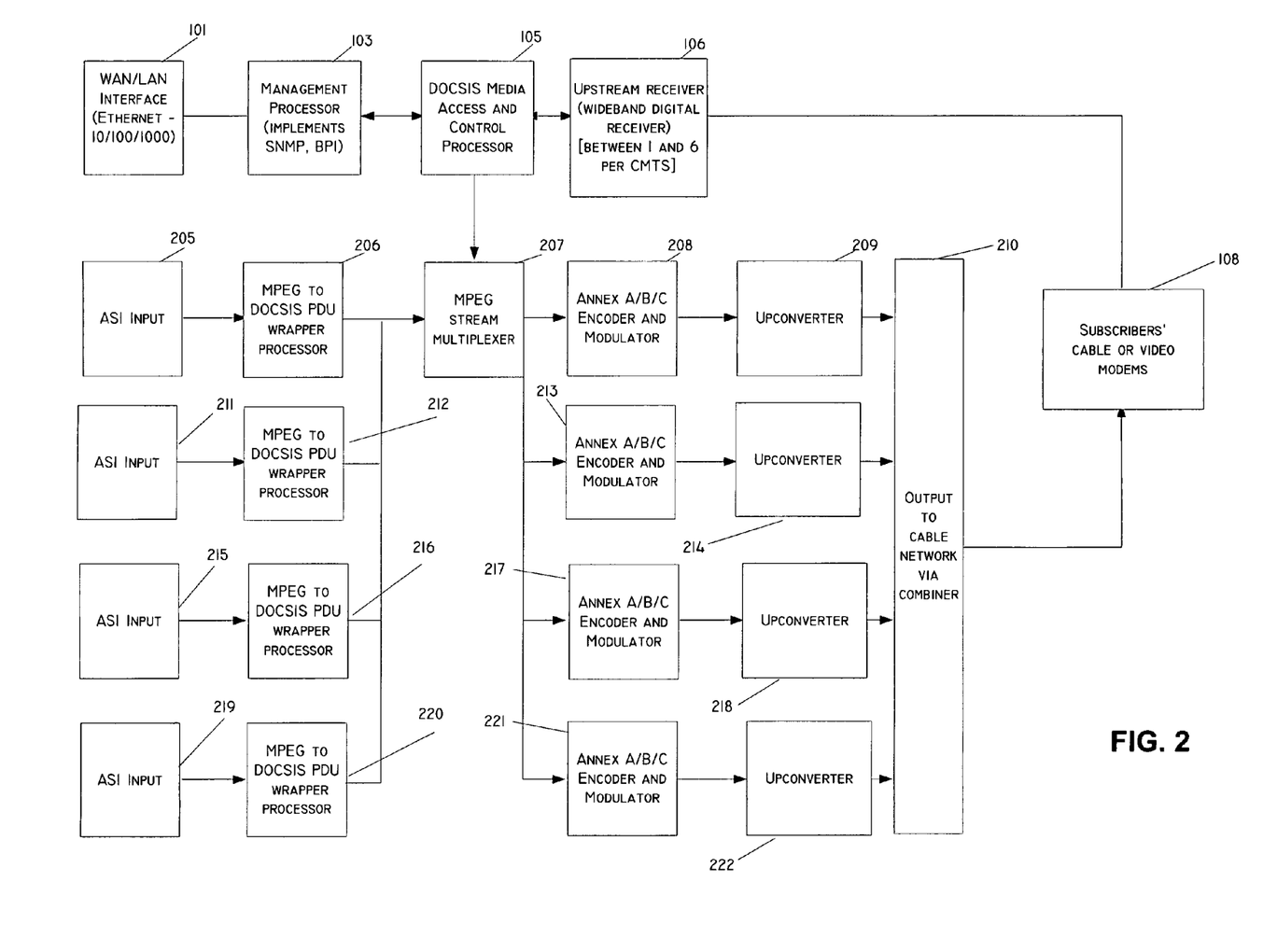
FIG. 2 is a block diagram of the preferred implementation of a VMTS system.

In the exemplary arrangement shown in FIG. 2, the VMTS includes, by way of example, a plurality of ASI or Gigabit Ethernet inputs 205, 211, 215, 219, a plurality of MPEG to DOCSIS PDU wrapper processors 206, 212, 216, 220, a MPEG stream multiplexer 207, a plurality of Annex A/B/C encoders and modulators 208, 213, 217, 221, a plurality of up-converters 209, 214, 218, 222, an output-to-cable network combiner 210, a WAN/LAN interface 101, a management processor 103, a DOCSIS media access and control processor 105, an upstream receiver 106. The upstream receiver 106 and the output-to-cable network combiner 210 are connected to a subscriber's cable or modem 108. The WAN/LAN interface is coupled through the management processor 103 and the DOCSIS media access and control processor 105 to the upstream receiver 106. ASI refers to the "asynchronous serial interface" of the MPEG transport stream protocol. Annexes of the ITU-J83 specification describe forward error correction and encoding used.

The plurality of ASI inputs 205, 211, 215, 219 is connected to the plurality of MPEG to DOCSIS PDU wrapper processors 206, 212, 216, 220, respectively. The plurality of MPEG to DOCSIS PDU wrapper processors 206, 212, 216, 220 is connected to the MPEG stream multiplexer 207. The MPEG stream multiplexer 207 is connected to the DOCSIS media access and control processor 203 and to the plurality of Annex A/B/C encoders and modulators 208, 213, 217, 221. The plurality of Annex A/B/C encoders and modulators 208, 213, 217, 221 is connected to the plurality of up-converters 209, 214, 218, 222, respectively. The plurality of up-converters 209, 214, 218, 222 is connected to the output-to-cable network combiner 210.

Received data from the subscriber's cable or video modems 108 are received by upstream receiver 106. The received data are pass through the DOCSIS media access and control processor 105, through the management processor 103 to the WAN/LAN interface 101.

Data from the plurality of ASI inputs 205, 211, 215, 219 are passed to the plurality of MPEG to DOCSIS PDU wrapper processors 206, 212, 216, 220, respectively. Wrapped data from the plurality of MPEG to DOCSIS PDU wrapper processors 206, 212, 216, 220 are passed to the MPEG stream multiplexer 207. Data from the MPEG stream multiplexer 207 are passed to the plurality of Annex A/B/C encoders and modulators 208, 213, 217, 221. Data from the plurality of Annex A/B/C encoders and modulators 208, 213, 217, 221 are up-converted to an appropriate RF frequency, currently above 80 MHz, by the plurality of up-converters 209, 214, 218, 222, respectively. The up-converted data from the plurality of up-converters 209, 214, 218, 222 are combined by output-to-cable network combiner 210, and then sent to the subscribers' cable or video modems 108.

A second preferred implementation replaces the separate CMTS core with demodulator which is connected to an existing CMTS, which allows reuse of already purchased CMTS equipment. This implementation demodulates QAM data from the CMTS's downstream output. The demodulated data includes of a MPEG transport stream, which can then be fed to the MPEG stream multiplexer 207 and then to the encoders and modulators as described previously.

A number of alternative arrangements may be used to convert the Ethernet stream into video. One case might be to use a home computer with an Ethernet connection as the set top device terminating into a common LCD display. Most home computers today contain digital video decoding capabilities for MPEG2 and Microsoft's Windows Media 9 encoded data streams. The LCD display could be used to display the digital TV, or it might be used to display the Interactive Program Guide (IPG) and the output going to a remotely connected video monitor. If the computer were capable of displaying DVB disks, then the computer would have the capability needed to convert the digital video into a usable display.

Alternatively, a video MPEG decoder chip connected to an Ethernet chip would form an inexpensive tiny set top unit for driving a very low cost set top unit. Cable modems are inexpensive today because the cable industry created a standard that caused cable modems to become commodity electronics, with very low margins. They can be purchased for as little as $35 each in quantity at this time, while today's proprietary digital two-way set-top units sell in the $150+ range.

In the preferred embodiment of this invention, a VMTS in some ways resemble a CMTS, but is differentiated to support an extremely high data delivery rate in the downstream, head end to consumer, direction. Video over IP traffic differs from traditional data traffic, and the differences between a CMTS and an VMTS are listed in the following table.

TABLE

| | CMTS | VMTS |
|---|---|---|
| TRAFFIC FLOW | About the same volume of upstream and downstream traffic | Far greater downstream traffic than upstream traffic |
| TYPE OF TRAFFIC | Personal computer user data | Control messages from set top box (e.g., user hit the "fast forward" button on their remote, user turned off the TV, time for a new traffic encryption key (TEK) in accordance with the DOCSIS BPI specification, etc.). |
| NUMBER OF DOWNSTREAMS PER MAC DOMAIN | One | Many |
| TRAFFIC FILTERING REQUIREMENTS (SECURITY) | High | Low |
| ROUTING INTEGRATION REQUIREMENTS | High | Low |
| PACKET FLOW RATE | Unpredictable | Predictable |
| JITTER TOLERANCE | Medium | Low |
| LATENCY TOLERANCE | High | Low |
| DATA CONVERSION REQUIRED | None | MPEG-2/4, etc. (from video server) to IP |

In FIG. 2, the traffic through the DOCSIS core is limited solely to set-top box control functions, baseline privacy interface messages, etc. All video traffic bypasses the core, eliminating an expensive processor and extensive routing software. The standard DOCSIS messages from the media access and control (MAC) chip emerge as MPEG-2 cells, and the MPEG-2 cells are multiplexed by MPEG stream multiplexer 207 into a common dense QAM multiplexer/modulator that handles the video traffic. See co-pending U.S. patent application Ser. No. 10/328,868, with filing date of Dec. 23, 2002 by Baran et al., which is incorporated herein by reference.

Figure 3:
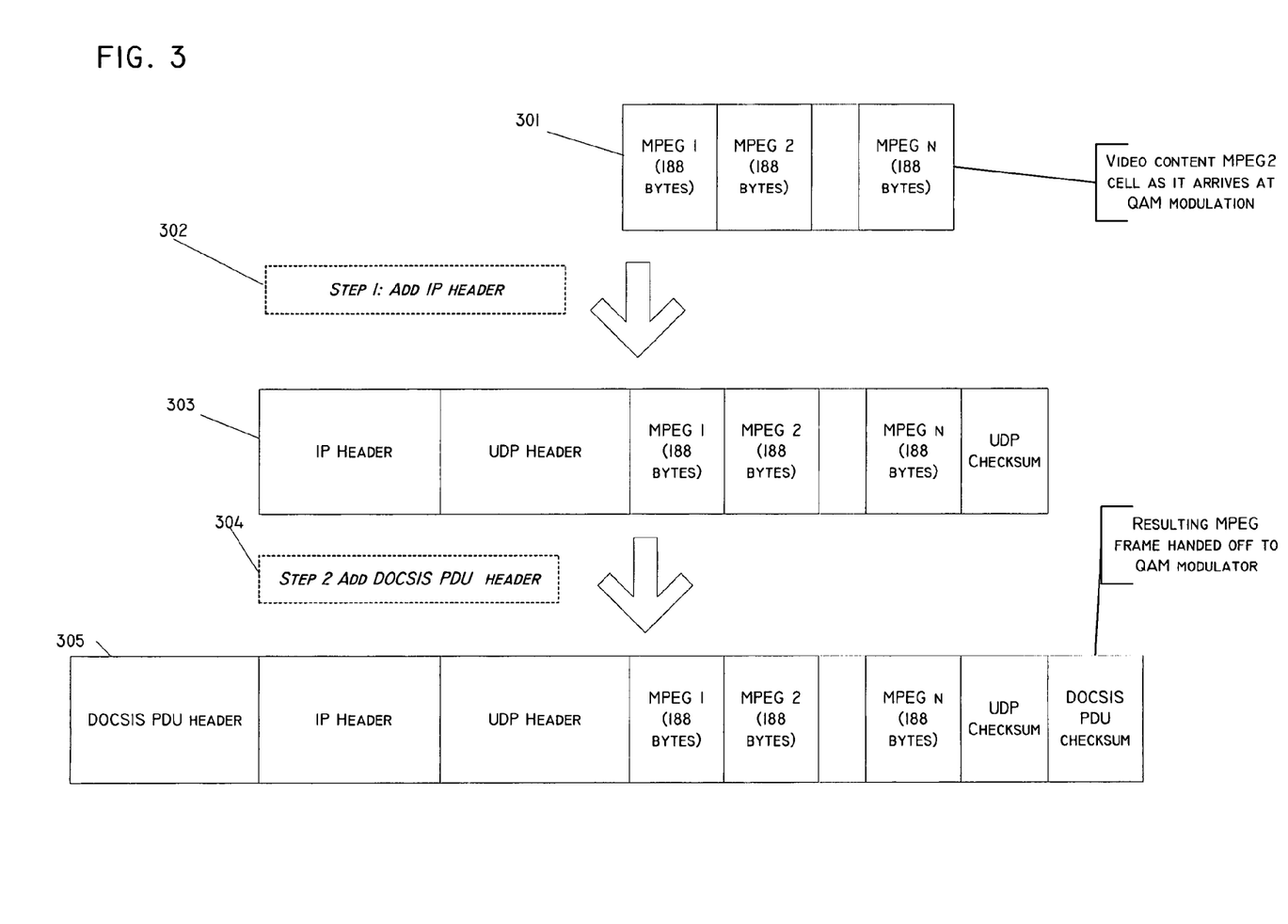
FIG. 3 is a representation of MPEG digital packets showing the addition of headers and trailers as used in this invention.
Figure 4:
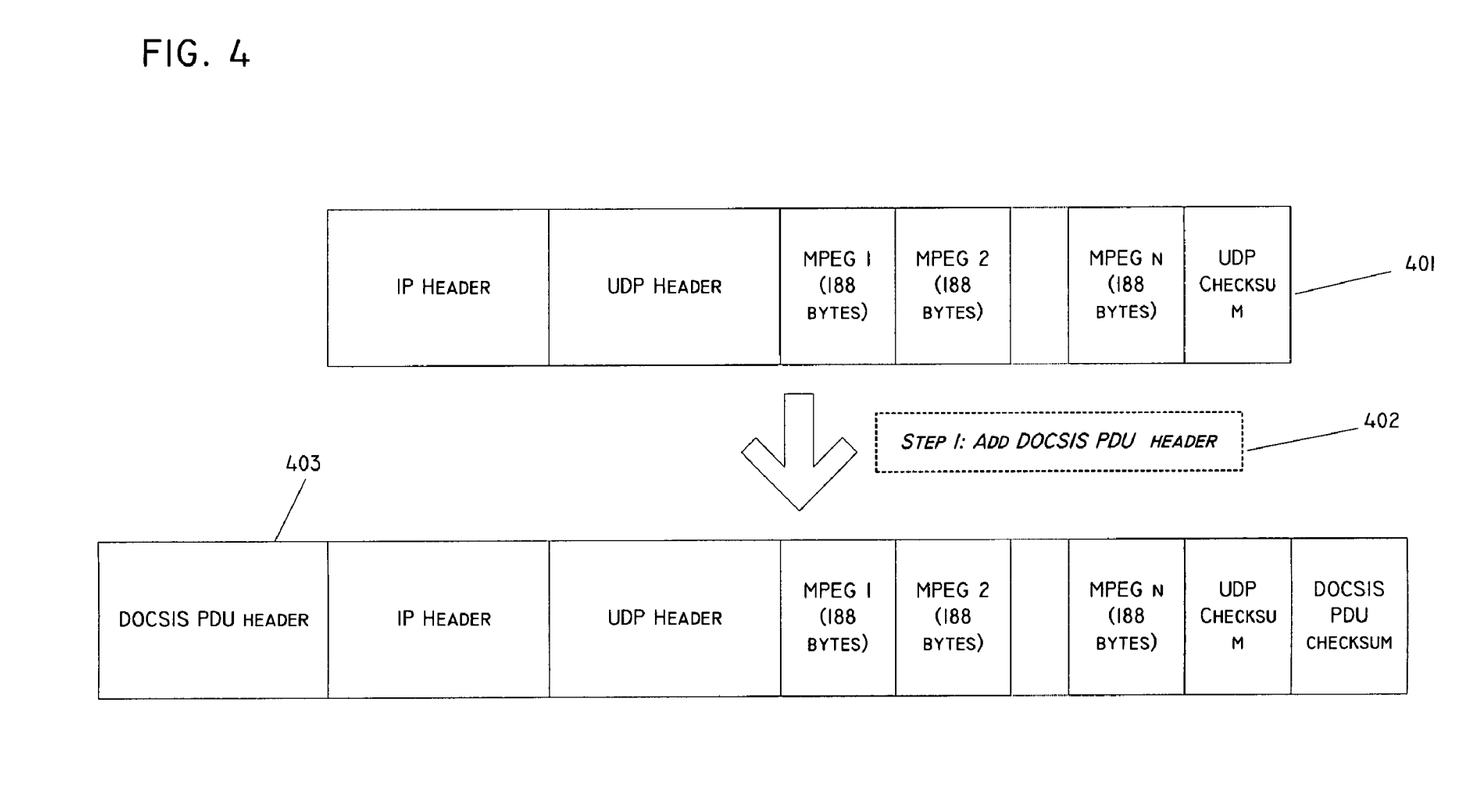
FIG. 4 is the same as FIG. 3, except that FIG. 4 shows the addition of headers and trailers as used in this invention when the incoming packet is already an IP packet, as used by PC-based protocols such as Windows Media from Microsoft or Real Media from Real Networks.
Figure 5:
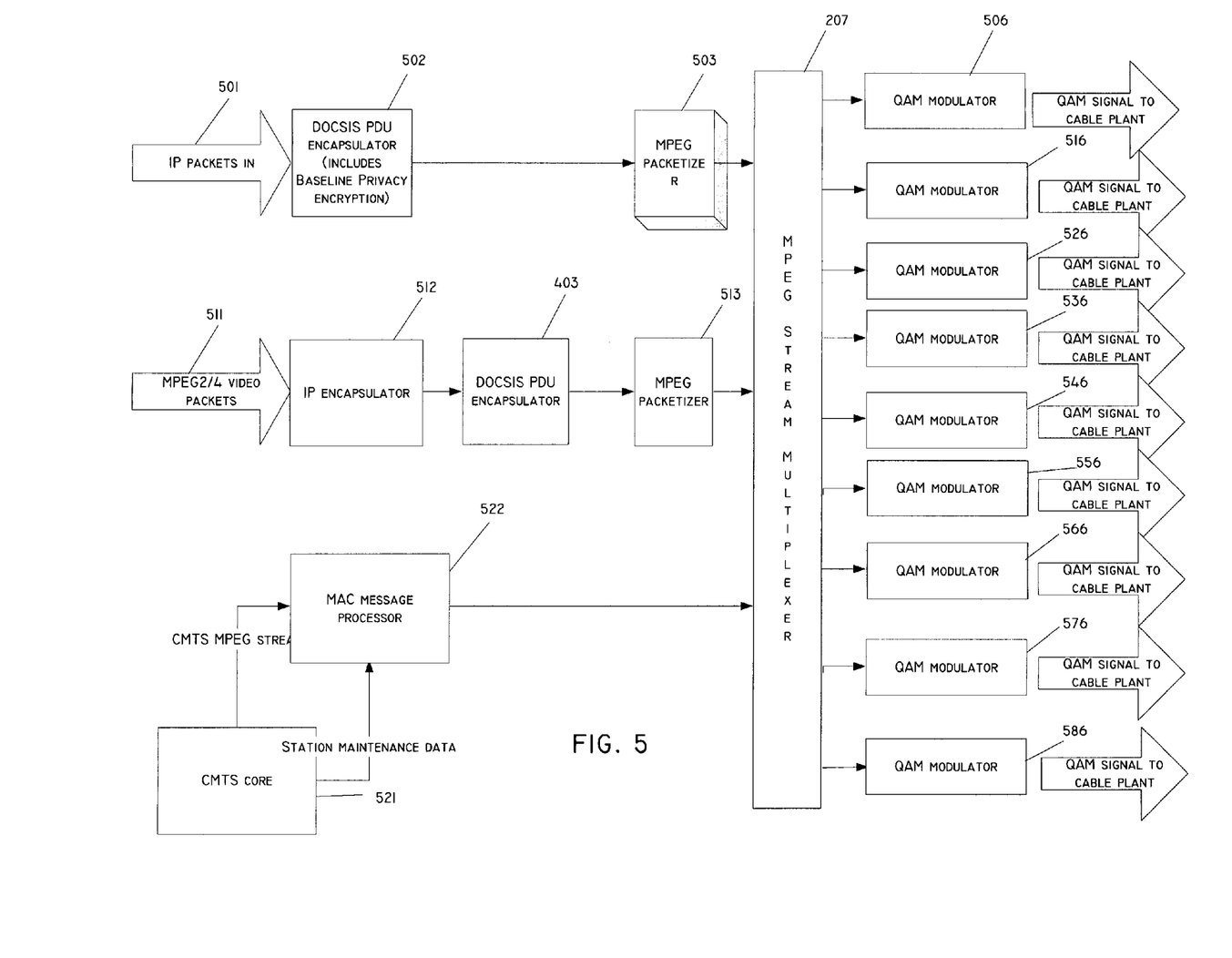
FIG. 5 is a block diagram showing the simultaneous processing of IP and MPEG packets in the downstream, to the user, direction.

The plurality of Annex A/B/C encoders and modulators 208, 213, 217, 221 encapsulates data from CMTS's control information, as well as video-over-IP data together with control information from the VMTS. The plurality of Annex A/B/C encoders and modulators 208, 213, 217, 221 is designed to also encapsulate traffic, which may arrive as MPEG frames or standard IP packets. In the case of MPEG frames, as illustrated in FIG. 3, incoming MPEG cells 301 from the plurality of ASI inputs 205, 211, 215, 219 are concatenated together, wrapped with an IP header 302, 303 by the plurality of MPEG to DOCSIS PDU wrapper processors 206, 212, 216, 220, respectively, converted to MPEG-2 cell contents by adding DOCSIS headers 305 using the DOCSIS protocol 304. The resulting MPEG cells carrying the wrapped data are passed to the plurality of Annex A/B/C encoders and modulators 208, 213, 217, 221 for delivery on the cable to subscribers' cable or video modems 108. See FIGS. 2-5. In the case of IP packets which contain encoded video, such as packets containing Microsoft's Windows Media 9, the IP packets may be concatenated together and optionally wrapped with a second IP header. Then the concatenated IP packets wrapped with the second IP header are converted to MPEG-2 cells which are passed to the multiplexer 207 and the plurality of Annex A/B/C encoders and modulators 208, 213, 217, 221 and then to the plurality of up-converters 209, 214, 218, 222, respectively, for delivery on the cable. FIG. 4 and FIG. 5 describe the processing prior to QAM multiplexing/modulation.

FIG. 4 shows the case where an incoming cell 401 already has an IP header, and adding a DOCSIS PDU header 402 generates the required cell 403 for the multiplexer 207 and the plurality of Annex A/B/C encoders and modulators 208, 213, 217, 221 and then to the plurality of up-converters 209, 214, 218, 222, respectively, for delivery on the cable.

FIG. 5 illustrates the simultaneous processing of IP and MPEG packets in the downstream, to the user, direction. IP packets 501 in to the system pass through the DOCSIS PDU encapsulator 502. The DOCSIS PDU encapsulator 502 includes baseline privacy encryption, when required. The encapsulated IP packets pass to the MPEG packetizer 503, to the MPEG stream multiplexer 207 and then to the plurality of QAM modulators 506, 516, 526, 536, 546, 556, 566, 576, 586. Alternatively, MPEG-2/4 video packets 511 pass to the IP encapsulator 512, the DOCSIS PDU encapsulator 403, and then to the MPEG packetizer 513. The packetized encapsulated video packets then pass to the MPEG stream multiplexer 207 and then to the plurality of QAM modulators 506, 516, 526, 536, 546, 556, 566, 576, 586. The CMTS core 521 maintains data regarding which customer devices are online and necessary timing and encryption information required by the DOCSIS protocol, and the CMTS MPEG stream passes to the MAC message processor 522 and then to the MPEG stream multiplexer 207 and then to the plurality of QAM modulators 506, 516, 526, 536, 546, 556, 566, 576, 586.

Figure 6:
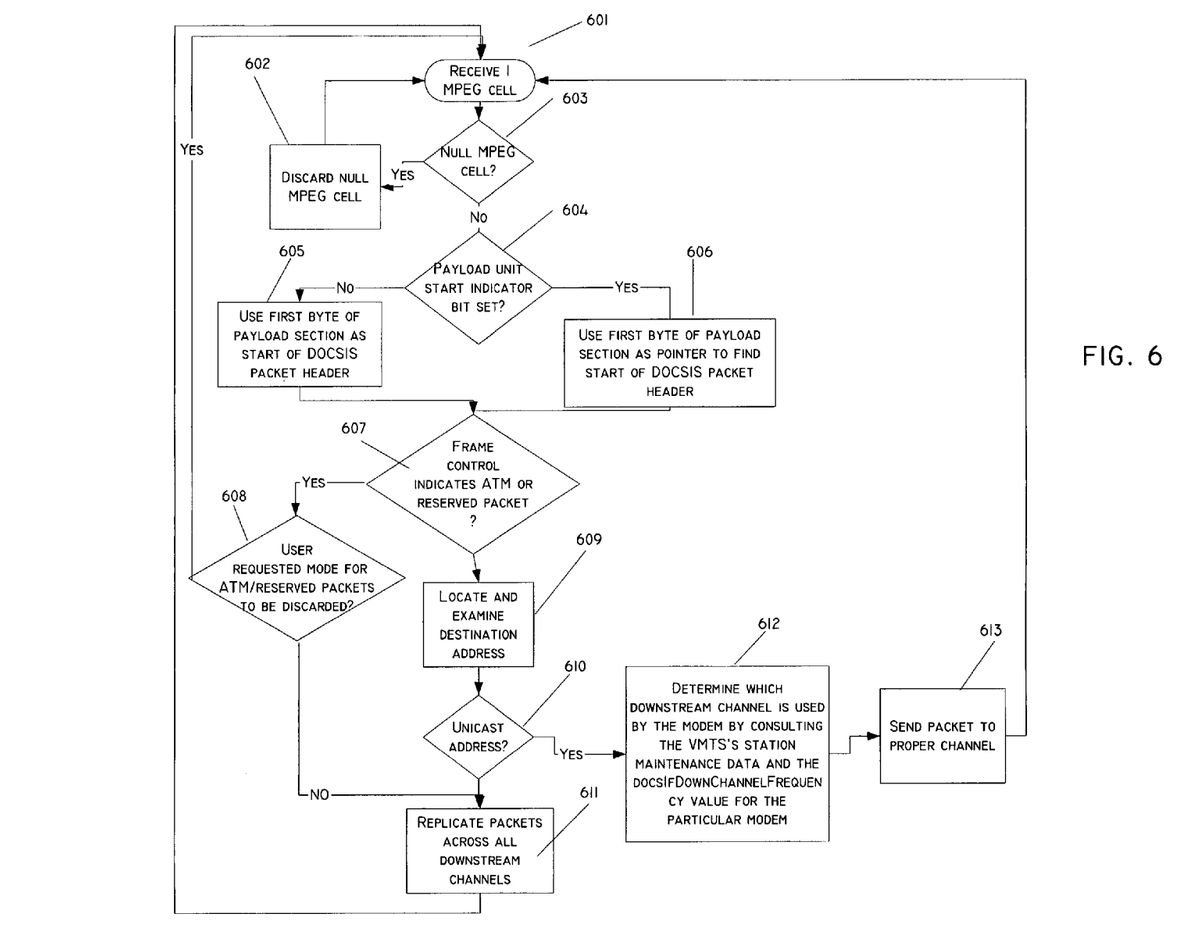
FIG. 6 is a flow chart of the processing within the VMTS.

Given the nature of DOCSIS control information, the multiplexing process is somewhat complicated. FIG. 6 illustrates the logic flow necessary to properly multiplex, by MPEG stream multiplexer 207, the messages onto the appropriate downstream channel. In general, the VMTS transmits MPEG null packets if the VMTS does not have any downstream data to be transmitted. The MPEG null packets may be removed by the multiplexer logic if doing so will improve downstream traffic flow, i.e., if data were to be sent from a non-VMTS source, the non-VMTS data will take precedence over the null frames from the VMTS.

More particularly, packets received 601 by the MPEG stream multiplexer 207 are checked to determine 603 if the received packet is a null MPEG cell. If yes, then the VMTS discards 602 the null MPEG cell. If no, then the VMTS checks 604 if a payload unit start indicator bit is set. If the payload unit start indicator bit were not set, then the VMTS uses 605 the first byte of payload section as start of DOCSIS packet header. If the payload unit start indicator bit were set, then the VMTS uses 606 the first byte of payload section as a pointer to find start of the DOCSIS packet header. The VMTS then checks 607 if the frame control indicates ATM or reserved packet, then the VMTS determines 608 if the user requested mode for ATM/reserved packets are to be discarded. If no, then the VMTS locates and examines 609 destination address. The VMTS then determines 610 if the destination address is a unicast address. If these packets are to be discarded, then proceed back to 601. If they are to be passed, then send them to all downstream channels 611. If the packet were not the ATM or reserved packet, then the VMTS replicates 611 packets across all downstream channels, and then goes to receive another PEG cell 601. If the packet were the ATM or reserved packet, then the packet is unicast, then the VMTS determines 612 which downstream channel is used by the modem by consulting the VMTS's station maintenance data, on the DOCSIS CMTS core, and the DOCSIS down channel frequency value for the particular modem. The VMTS then sends 613 the packet to the proper channel, and then receives another MPEG cell 601.

Figure 7:
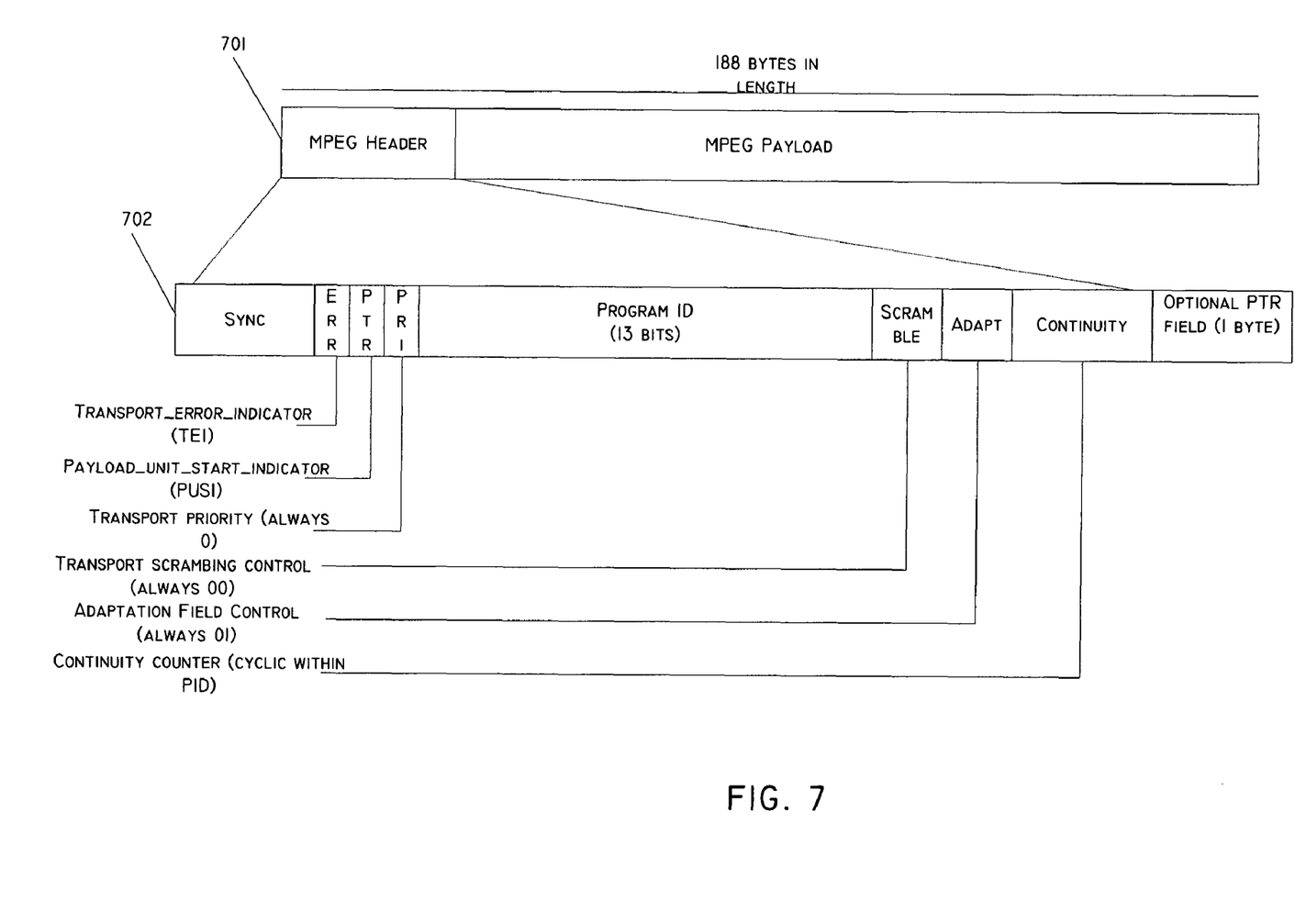
FIG. 7 is a representation of the contents of the MPEG-2 packet format used by the Data Over Cable Service Interface Specification (DOCSIS) protocol in the context of locating a media access and control (MAC) message with the underlying transport frame.
Figure 8:
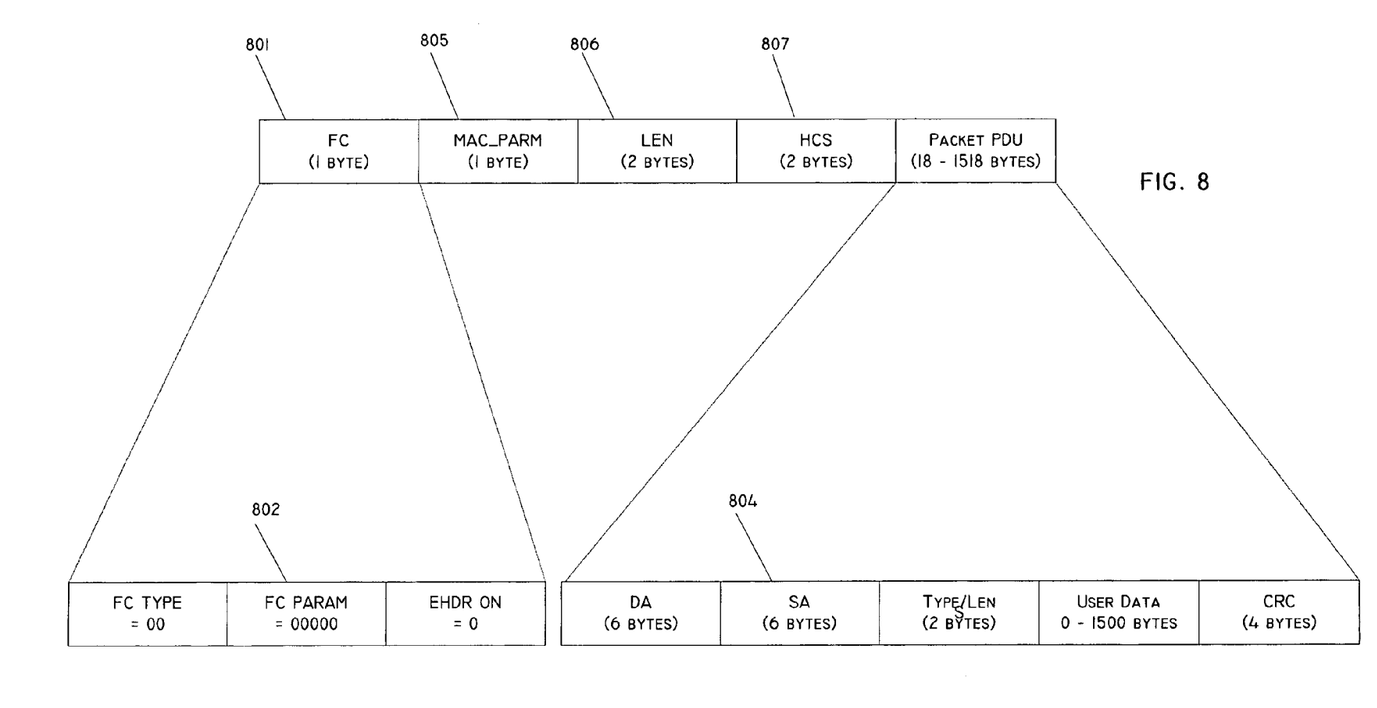
FIG. 8 is a representation of the structure of a DOCSIS PDU packet.

If the MPEG packet 701, shown in FIG. 7, received by the MPEG stream multiplexer 207 from a DOCSIS VMTS source has, in the header 702, the Payload Unit Start Indicator bit set, PUSI; then the packet contains a DOCSIS Media Access and Control (MAC) Message. When this occurs, the multiplexer must use the pointer_field byte to determine where the MAC message begins within the MPEG frame. This is the first byte which follows the MPEG header when the PUSI bit is 1, and is thus the $5^{th}$ byte of a MPEG packet. This offset points to the frame control (FC) field 801 of FIG. 8, which defines the type of MAC message.

The single byte of FC information 801 includes three subfields 802: FC_TYPE, most significant two bits; FC_PARAM, 5 bits to right of FC_TYPE; and, EHDR_ON, 1 bit; see FIG. 8. The packet in FIG. 8 includes the MAC-PARM 805, LEN 806, HCS 807 and PACKET PDU 805. The packet PDU includes five subfields 804: DA, SA, TYPE/LEN, USER DATA and CRC.

Packets with an FC_PARAM of 00 are data packets which are destined for a particular DOCSIS modem. In the preferred embodiment, the video set-top needs only a single tuner that is tuned to a selected downstream frequency. By examining the destination address field, 6 bytes; see FIG. 8, and using a database of modem to channel mapping information provided by the RetroVue controller, B in FIG. 9, the multiplexer determines to which QAM stream each particular packet is directed.

Packets with an FC_PARAM of 01 or 10 are ATM data or reserved for future use, respectively, and should be replicated onto all downstreams by the multiplexer or discarded completely, as configured by the user.

Figure 9:
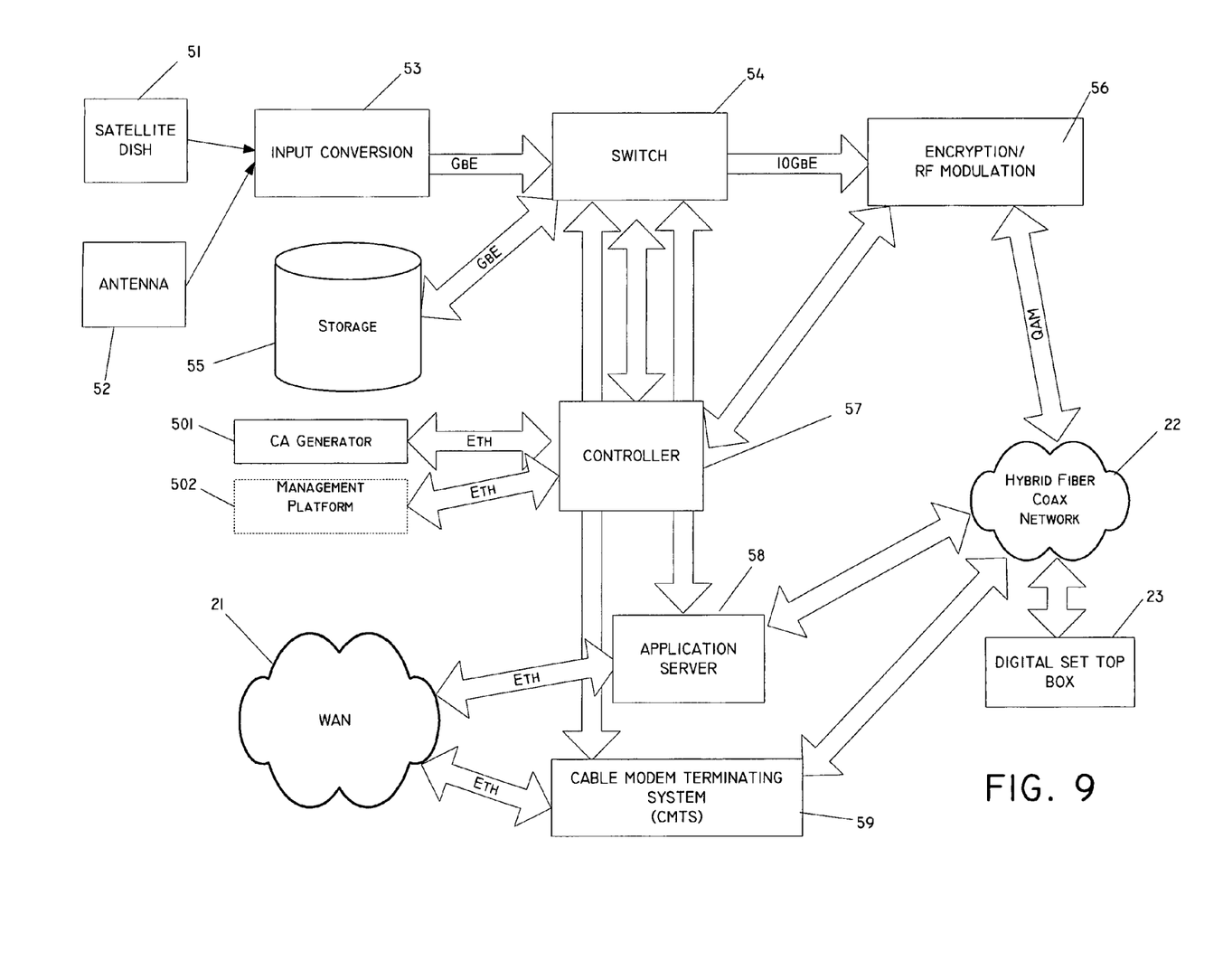
FIG. 9 is a block diagram showing the overall system configuration including the source of programming to the end set-top unit.
Figure 10:
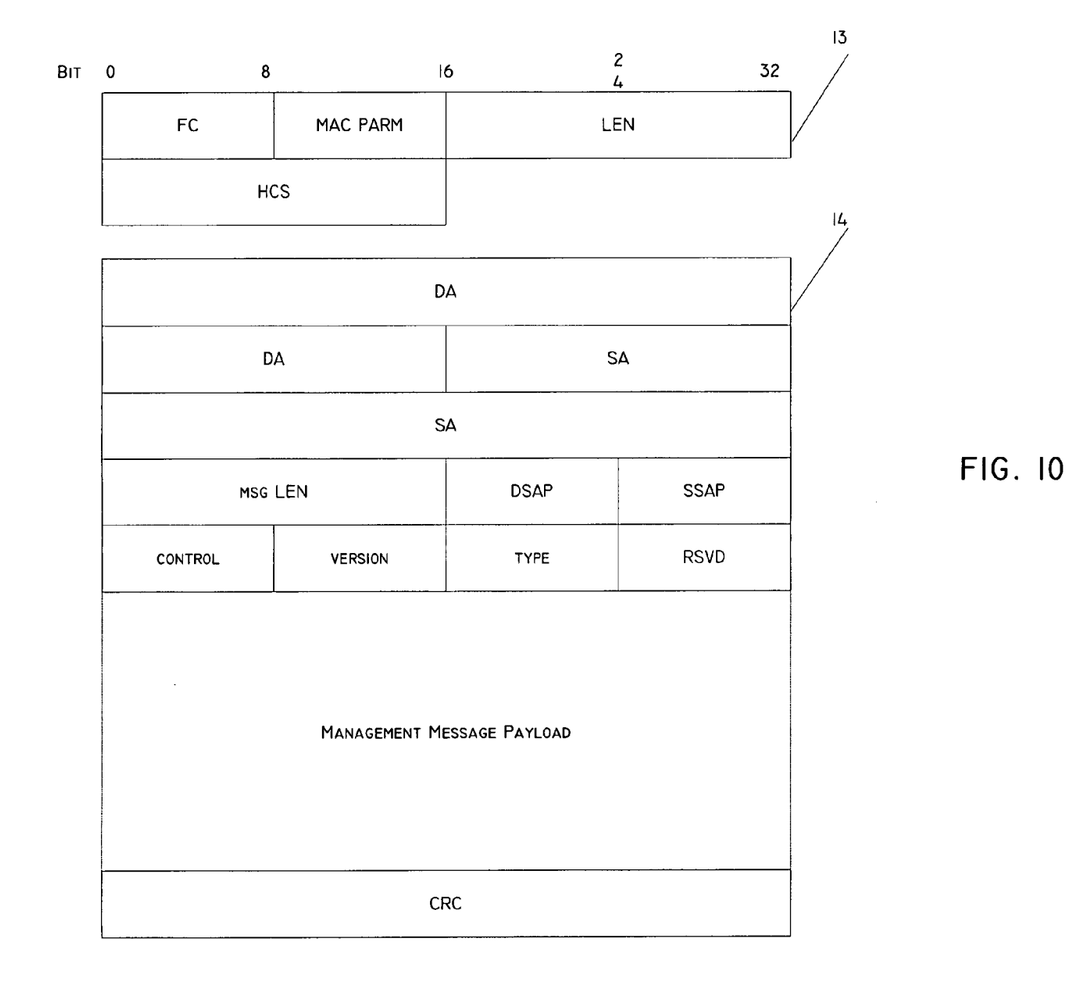
FIG. 10 is the layout of a DOCSIS Media Access and Control (MAC) message packet.

Packets 13 with an FC_PARAM of 11 are MAC messages of the format shown in FIG. 10. If the destination address, DA 14 in FIG. 10, were 01-E0-2F-00-00-01 or FF-FF-FF-FF-FF-FF, then the MAC message should be multiplexed/delivered on ALL QAM channels that are under the control of the VMTS. If the destination address were in the database of to channel mapping information provided by the RetroVue controller, B in FIG. 9, then the MPEG stream multiplexer 207 determines on which single QAM channel the particular packet should be delivered. If the destination address were not that of a particular modem, then the MAC message may be multiplexed by the MPEG stream multiplexer 207 across ALL downstream channels with active modems or discarded at the user's discretion.

One embodiment of the apparatus described in this disclosure includes having the digital audio signals replaced with a common substitute digital audio emergency warning signals allowing all set-tops to receive a common emergency message. A further embodiment includes multicasting, with individually downstream signals directed to two or more different set-top units in lieu of a single set-top unit, thereby allowing multicasting of a single downstream stream.

FIG. 9 shows a system block diagram. Programming or content may be received from a satellite through satellite dish 51, and converted to appropriate frequency by input converter 53. Programming or content alternatively make arrive from an antenna 52 and converted by input converter 53. Programming or content from input converter 53 may be in digital form, and sent over a high speed data link, such as Gigabit Ethernet, to switch 54. Switch 54 routes data to any of encryptor and RF modulator 56 and to or from controller 57 and to or from storage 55. Controller 57 routes data between switch 54 and legacy devices such as a conditional access key generator 501 and a management platform 502 and the encryptor and RF modulator 56. CMTS 59 exchanges data from HFC network 22 with the switch 54, which can in turn pass data to controller 57, application server 58, encryptor and RF modulator 56, wide area network 21 such as the Internet, and the storage unit 55. Data may be sent over hybrid fiber and/or coax cable network 22 to a user, set top box 23. The set top box 23 is connected to a television, as is well known in the art.

Packets with an FC_PARAM of 00 are data packets which are destined for a particular DOCSIS modem. The video set-top needs only a single tuner that is tuned to a selected downstream frequency. By examining the destination address field, 6 bytes; see FIG. 8, and using a database of modem to channel mapping information provided by the RetroVue controller, B in FIG. 9, the multiplexer determines to which QAM stream each particular packet is directed.

Packets with an FC_PARAM of 01 or 10 are ATM data or reserved for future use, respectively, and should be replicated onto all downstreams by the multiplexer or discarded completely, as configured by the user.

Packets 13 with an FC_PARAM of 11 are MAC messages of the format shown in FIG. 10. If the destination address, DA 14 in FIG. 10, were 01-E0-2F-00-00-01 or FF-FF-FF-FF-FF-FF, then the MAC message should be multiplexed/delivered on ALL QAM channels that are under the control of the VMTS. If the destination address were in the database of to channel mapping information provided by the RetroVue controller, B in FIG. 9, then the MPEG stream multiplexer 207 determines on which single QAM channel the particular packet should be delivered. If the destination address were not that of a particular modem, then the MAC message may be multiplexed by the MPEG stream multiplexer 207 across ALL downstream channels with active modems or discarded at the user's discretion.

Figure 11:
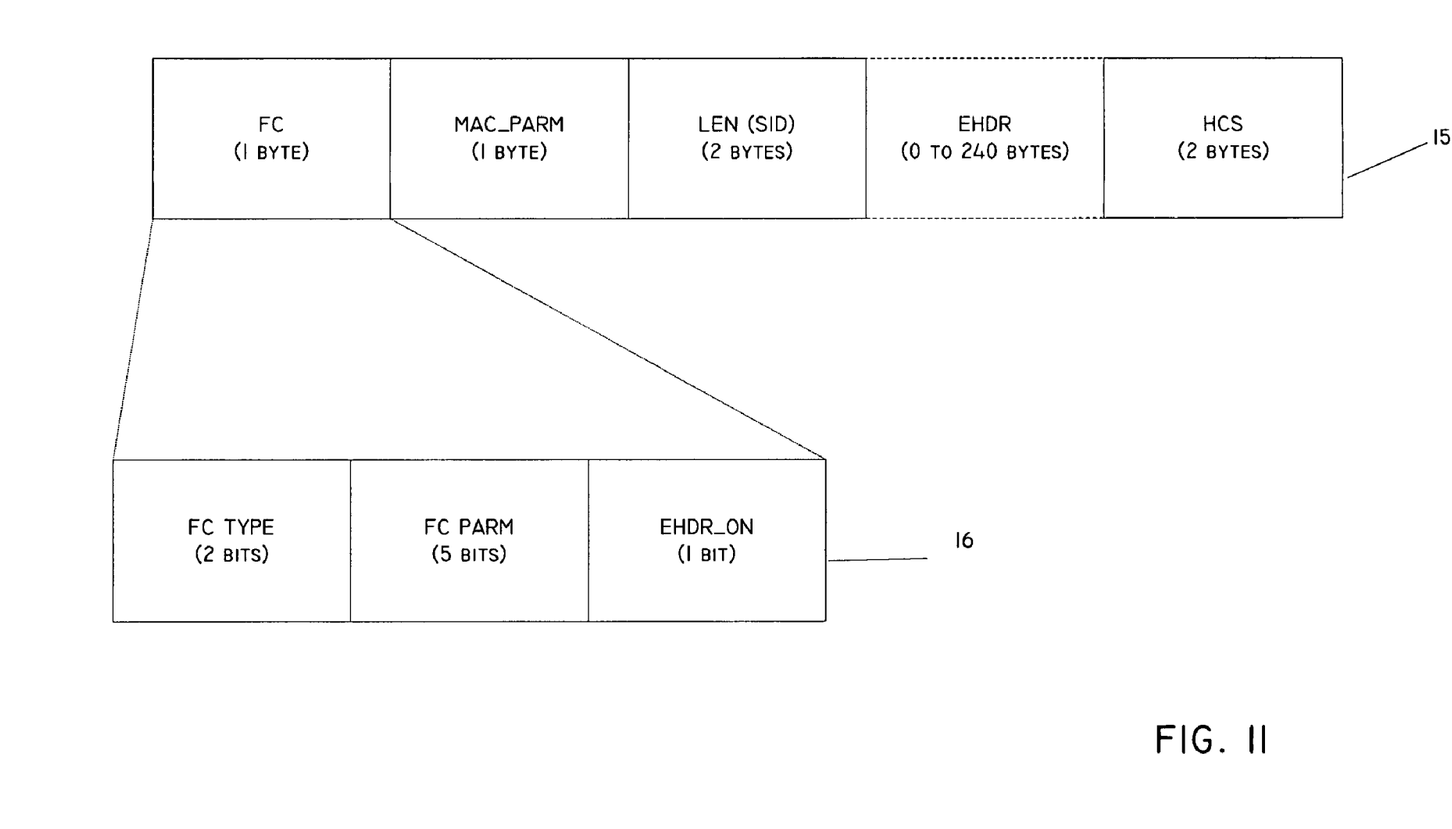
FIG. 11 is the layout of the header fields of a DOCSIS MAC or data packet.

FIG. 11 shows a more detailed portion of the header 15, with the FC 16 as one byte, broken out in terms of FCTYPE, FC PARM and EHDR_ON.

Reference is made to ANSI/SCTE Specification 23-1 Data-Over-Cable Systems Radio Frequency Interface Specification 1.1 to better understand some of the DOCSIS details.

It is apparent to those skilled in the art that various modifications can be made to the video modem termination system and method of the instant invention without departing from the scope or spirit of the invention, and it is intended that the present invention cover modifications and variations of the video modem termination system and method provided they come within the scope of the appended claims and their equivalents.

I claim:

1. An apparatus for reducing the equipment required for the downstream transmission of digital video data to a plurality of set-top units comprising:
 a QAM modulator for transmitting a plurality of downstream radio frequency (RF) carriers, with each carrier conveying a multiplicity of video, audio and control packet streams, individually directed to each of the plurality of set-top units creating a virtual circuit to each set-top unit in the plurality of set top units; and
 a controller coupled to the modulator that determines when control packets should be redundantly broadcast across carriers due to an unknown tuning status of an individual set top unit and when the control packets can be broadcast to a specific carrier to the individual set top unit that is known to be tuned to the specific carrier, whereby at least part of the control packet streams are redundantly broadcast on multiple carriers and individually addressed to a particular set top unit.

2. The apparatus as set forth in claim 1, with between 100 and 10,000 set-tops receiving digital video signals share a single CMTS.

3. The apparatus as set forth in claim 1 with a single shared CMTS having a demodulator for the recovery of the baseband modulation of RF modulated signals passing through said CMTS.

4. The apparatus as set forth in claim 1, with said QAM modulator modulating two or more RF channels with output on different frequencies.

5. The apparatus as set forth in claim 4, with a CMTS that meets DOCSIS standards without modifications.

6. The apparatus as set forth in claim 1 with each of the plurality of downstream RF carriers encoded using Internet Protocol (IP) packets.

7. The apparatus as set forth in claim 1, with the downstream RF carriers conveying digital video, digital audio and digital modem control signals.

8. The apparatus as set forth in claim 1, with the digital audio signals replaced with a common substitute digital audio emergency warning signals allowing all set-tops to receive a common emergency message.

9. The apparatus as set forth in claim 1, with individually downstream signals are directed to two or more different set-top units in lieu of a single set-top unit, thereby allowing multicasting of a single downstream stream.

10. An apparatus for reducing the equipment required for the downstream transmission of digital video data to a plurality of set-top units comprising:
 modulator means for transmitting a plurality of downstream radio frequency (RF) carriers, with each carrier conveying a multiplicity of video, audio and control packet streams, individually directed to each of the plurality of set-top units creating a virtual circuit to each set-top unit in the plurality of set top units; and
 a controller coupled to the modulator means that determines when control packets should be redundantly broadcast across carriers due to an unknown tuning status of an individual set top unit and when the control packets can be broadcast to a specific carrier to the individual set top unit that is known to be tuned to the specific carrier, whereby at least part of the control packet streams are redundantly transmitted on multiple carriers and individually addressed to a particular set top unit.

11. The apparatus as set forth in claim 10, with between 100 and 10,000 set-tops receiving digital video signals share a single CMTS.

12. The apparatus as set forth in claim 10 with a single shared CMTS having a demodulator for the recovery of the baseband modulation of RF modulated signals passing through said CMTS.

13. The apparatus as set forth in claim 10, with said QAM modulator modulating two or more RF channels with output on different frequencies.

14. The apparatus as set forth in claim 13, with a CMTS that meets DOCSIS standards without modifications.

15. The apparatus as set forth in claim 10 with each of the plurality of downstream RF carriers encoded using Internet Protocol (IP) packets.

16. The apparatus as set forth in claim 10, with the downstream RF carriers conveying digital video, digital audio and digital modem control signals.

17. The apparatus as set forth in claim 16, with the digital audio signals replaced with a common substitute digital audio emergency warning signals allowing all set-tops to receive a common emergency message.

18. The apparatus as set forth in claim 10, with individually downstream signals are directed to two or more different set-top units in lieu of a single set-top unit, thereby allowing multicasting of a single downstream stream.

19. A method for reducing the equipment required for the downstream transmission of digital video data to a plurality of set-top units comprising the steps of:
- transmitting a plurality of downstream radio frequency (RF) carriers, with each carrier conveying a multiplicity of video, audio and control packet streams, individually directed to each of the plurality of set-top units creating a virtual circuit to each set-top unit in the plurality of set top units;
- determining when control packets should be redundantly broadcast across carriers due to an unknown tuning status of an individual set top unit and when the control packets can be broadcast to a specific carrier to the individual set top unit that is known to be tuned to the specific carrier, whereby at least part of the control packet streams are redundantly transmitted on multiple carriers and individually addressed to a particular set top unit; and
- receiving, from a plurality of set top units, TV remote control signals encapsulated in a single common shared CMTS unit.

20. The method as set forth in claim 19, further including the step of sharing a single CMTS, between 100 and 10,000 set-tops receiving digital video signals.

21. The method as set forth in claim 20, further including the step of recovering, with a single shared CMTS having a demodulator, the baseband modulation of RF modulated signals passing through said CMTS.

22. The method as set forth in claim 19, further including the step of modulating, with a QAM modulator, two or more RF channels with output on different frequencies.

23. The method as set forth in claim 22, further including the step of employing with a CMTS that meets with DOCSIS standards.

24. The method as set forth in claim 19, further including the step encoding each of the plurality of downstream RF carriers encoded using Internet Protocol (IP) packets.

25. The method as set forth in claim 19, further including the step of conveying with the downstream RF carriers digital video, digital audio and digital modem control signals.

26. The apparatus as set forth in claim 25, further including the step of replacing the digital audio signals with a common substitute digital audio emergency warning signals allowing all set-tops to receive a common emergency message.

27. The method as set forth in claim 19, further including the step of directing individually downstream signals to two or more different set-top units in lieu of a single set-top unit, thereby allowing multicasting of a single downstream stream.

* * * * *

UNITED STATES PATENT AND TRADEMARK OFFICE
CERTIFICATE OF CORRECTION

| | | |
|---|---|---|
| PATENT NO. | : 7,849,488 B2 | Page 1 of 1 |
| APPLICATION NO. | : 10/892532 | |
| DATED | : December 7, 2010 | |
| INVENTOR(S) | : David Baran | |

It is certified that error appears in the above-identified patent and that said Letters Patent is hereby corrected as shown below:

\*\* At column 12, claim 26, line 18, delete "apparatus" and insert -- method -- \*\*

Signed and Sealed this
Fifth Day of April, 2011

David J. Kappos
*Director of the United States Patent and Trademark Office*